(12) United States Patent
Matlin et al.

(10) Patent No.: US 9,864,404 B2
(45) Date of Patent: Jan. 9, 2018

(54) TABLET FOLIO WITH MULTI-CONFIGURABLE AND POSITIONAL FEATURES

(71) Applicant: Fellowes Inc., Itasca, IL (US)

(72) Inventors: Tai Hoon Matlin, Round Lake Beach, IL (US); Shawn Applegate, Wood Dale, IL (US); Brian Chung, Chicago, IL (US)

(73) Assignee: Fellowes Inc., Itasca, IL (US)

( * ) Notice: Subject to any disclaimer, the term of this patent is extended or adjusted under 35 U.S.C. 154(b) by 0 days.

(21) Appl. No.: 14/988,221

(22) Filed: Jan. 5, 2016

(65) Prior Publication Data

US 2016/0246327 A1 Aug. 25, 2016

Related U.S. Application Data

(60) Provisional application No. 62/099,852, filed on Jan. 5, 2015.

(51) Int. Cl.
*G06F 1/16* (2006.01)
*H01F 7/02* (2006.01)

(52) U.S. Cl.
CPC ......... *G06F 1/1626* (2013.01); *H01F 7/0247* (2013.01)

(58) Field of Classification Search
CPC ......... G06F 1/1626; G06F 1/1628; H01F 7/02
USPC ..... 248/127, 441.1, 447, 454, 460; 206/320, 206/722; 361/679.56
See application file for complete search history.

(56) References Cited

U.S. PATENT DOCUMENTS

| | | | | |
|---|---|---|---|---|
| 5,445,266 A | * | 8/1995 | Prete | A45C 7/0086 190/102 |
| 8,143,983 B1 | * | 3/2012 | Lauder | G06F 1/1626 24/303 |
| 8,474,609 B1 | * | 7/2013 | Hong | A45C 11/00 206/320 |
| 8,724,300 B2 | * | 5/2014 | Smith | G06F 1/1628 206/320 |

(Continued)

*Primary Examiner* — Anita M King
(74) *Attorney, Agent, or Firm* — Wood, Phillips, Katz, Clark & Mortimer

(57) ABSTRACT

Multiple unique configurations for a computer tablet holding device are disclosed. One of device's configurations allows for multiple viewing angles through the use of multi-configurable assembly. Another configuration is a multi-positional computer tablet holding device that can be used within a folio, with the benefit of working cooperatively with an accessory such as a keyboard or wrist rest, or removed and used independently of the folio. The holding device and other accessories may be retained on the folio by judiciously placed magnets. The folio of the invention includes a first and second flap, the first flap including a plurality of magnets arranged in a matrix, the magnets being spaced apart at a distance, the riser including a base having a pair of magnets, said individual magnets of the pair of magnets being spaced apart at the distance, the riser being selectively attachable at positions corresponding to the magnet positions of the folio. The cooperatively working feature aids in the use of these items functioning cooperatively with each other when assembled together as well as aiding for the easy transportability of these items when they are within proximity of each other.

16 Claims, 14 Drawing Sheets

(56) References Cited

U.S. PATENT DOCUMENTS

| | | | |
|---|---|---|---|
| 8,997,983 B2* | 4/2015 | Sajid | G06F 1/1628 |
| | | | 206/320 |
| 9,382,033 B2* | 7/2016 | Poon | F16M 13/00 |
| 2009/0159763 A1* | 6/2009 | Kim | F16M 13/00 |
| | | | 248/174 |
| 2012/0293953 A1* | 11/2012 | Wu | F16M 11/10 |
| | | | 361/679.56 |

* cited by examiner

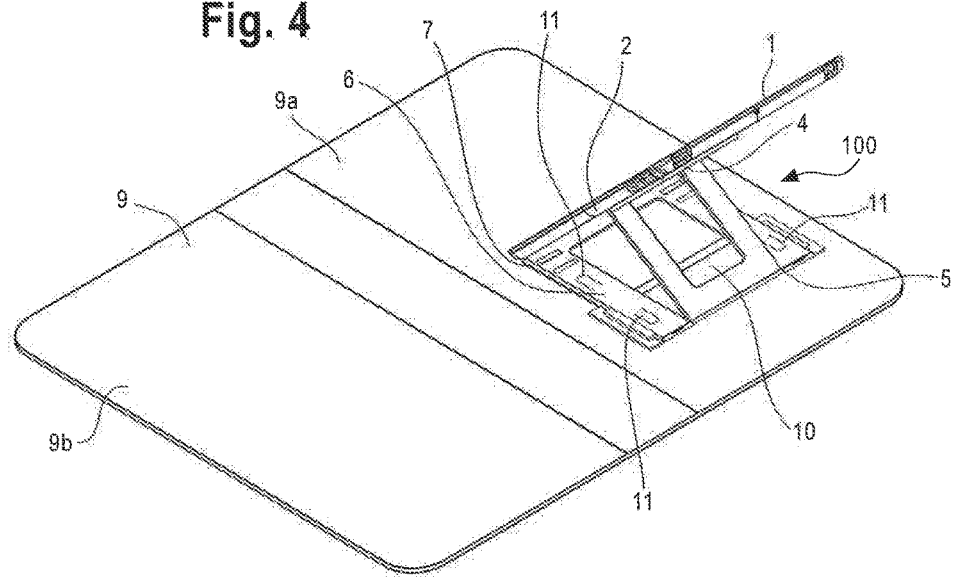
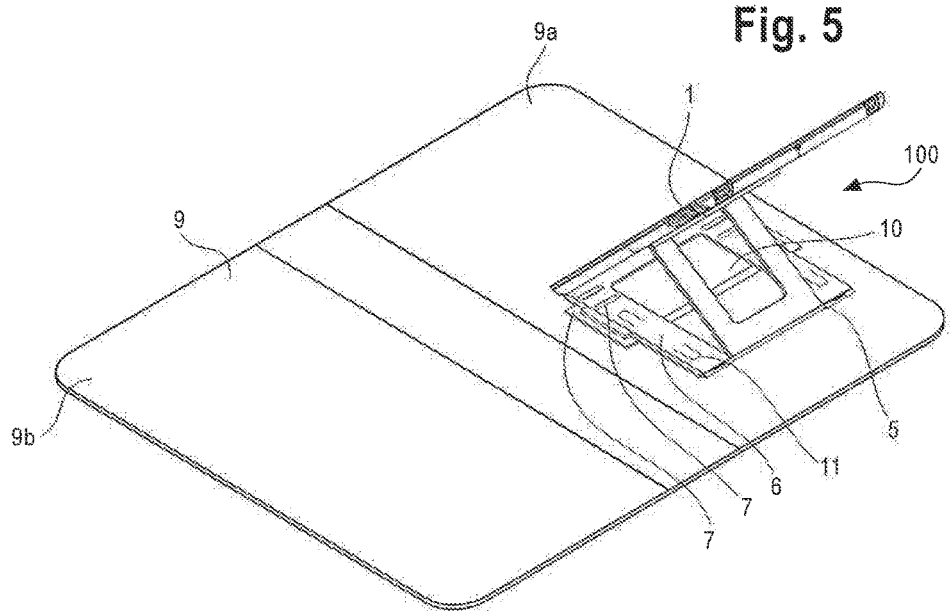

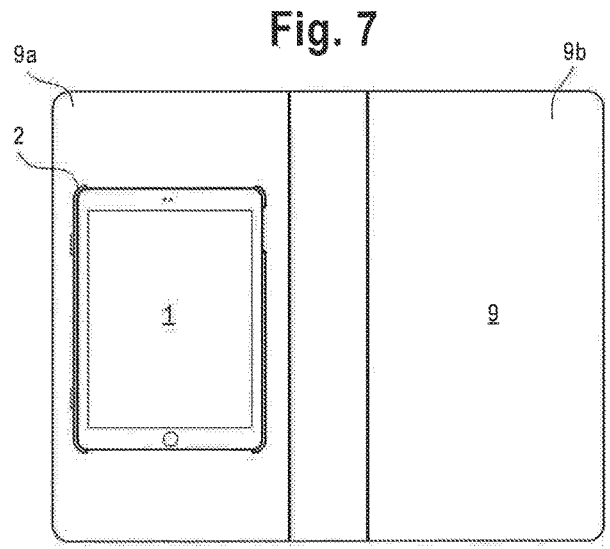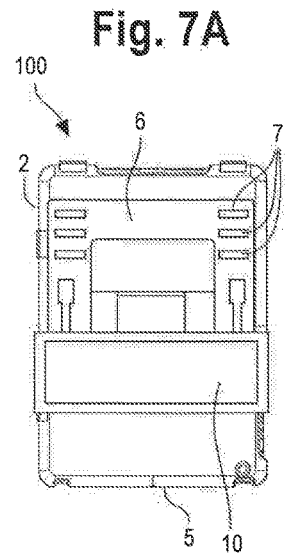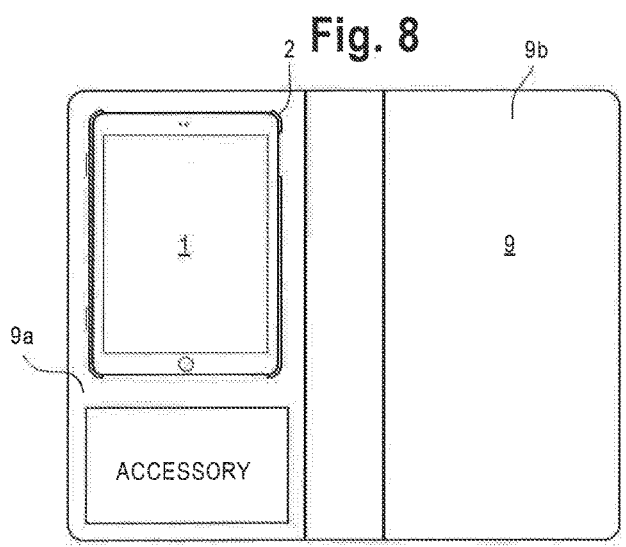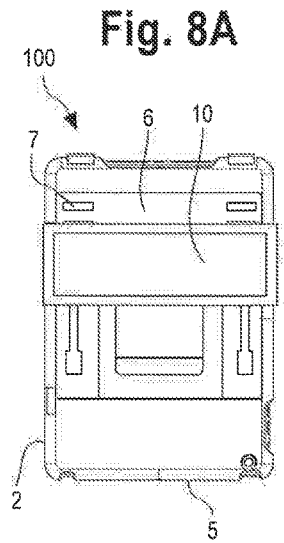

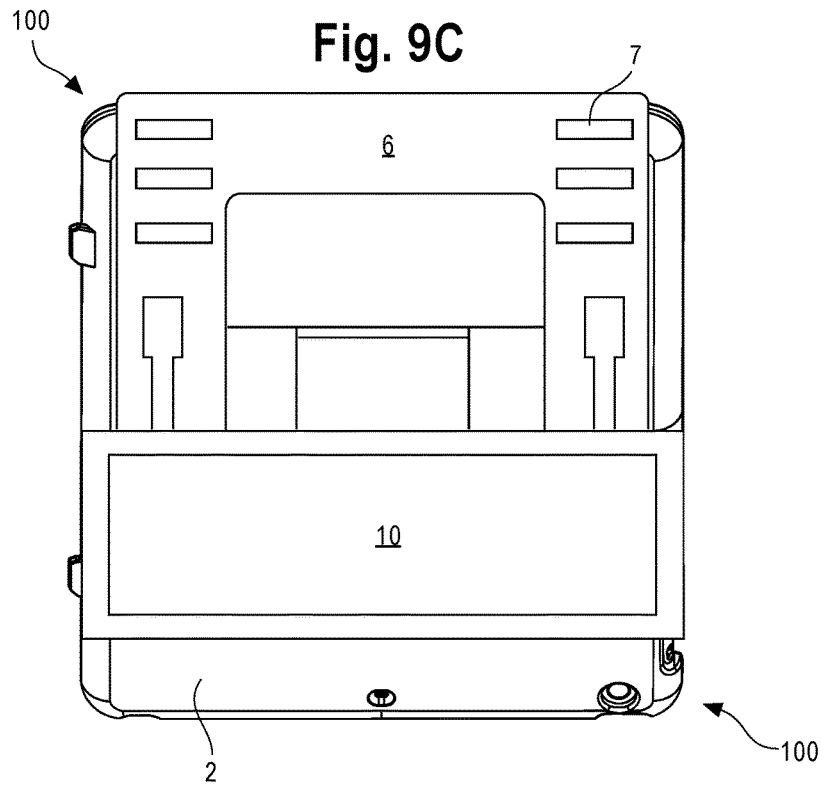
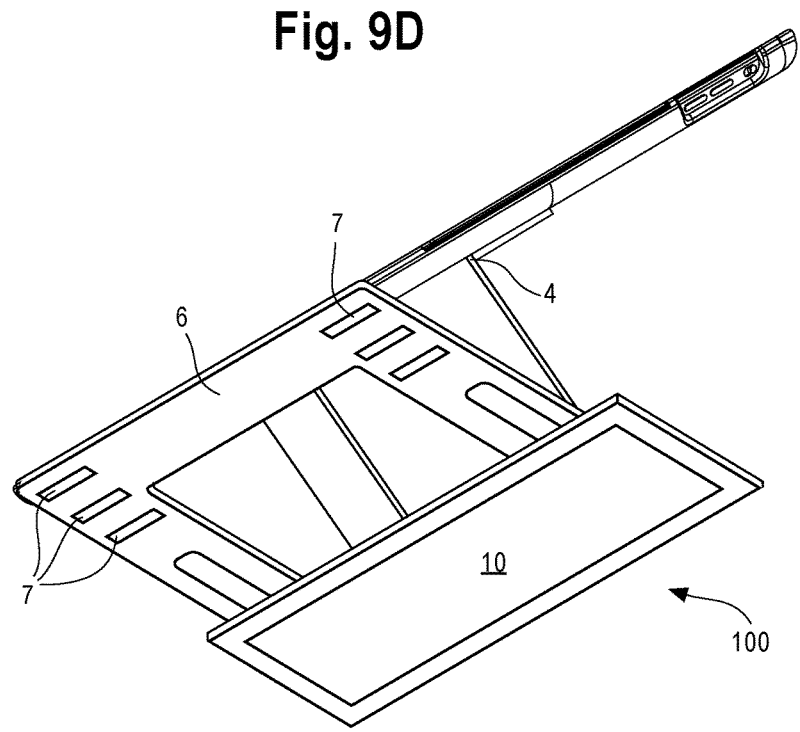

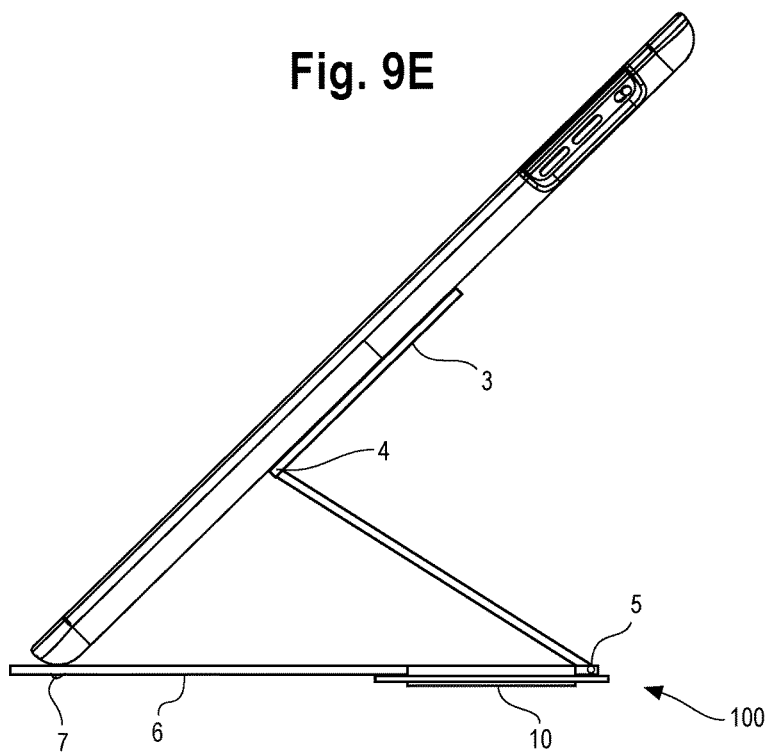
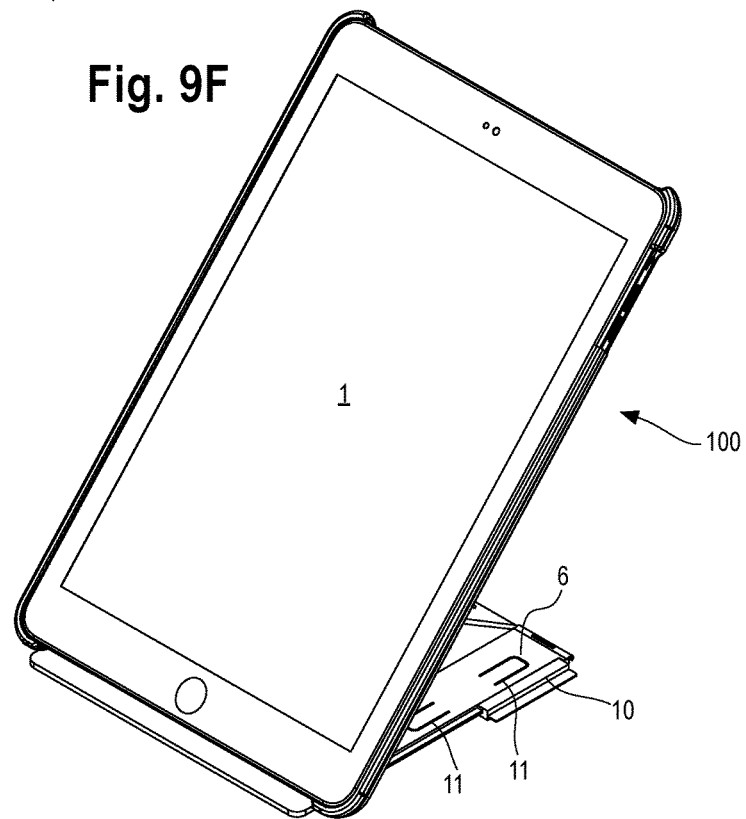

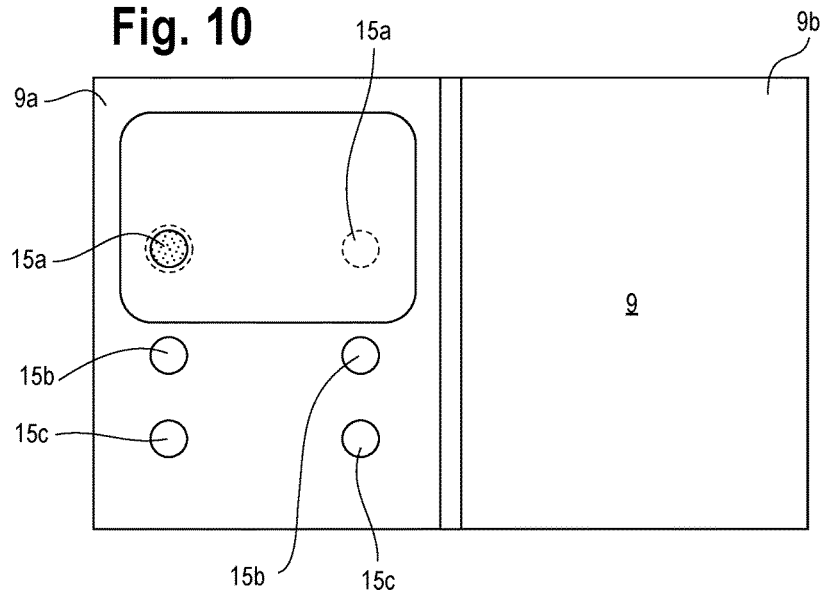
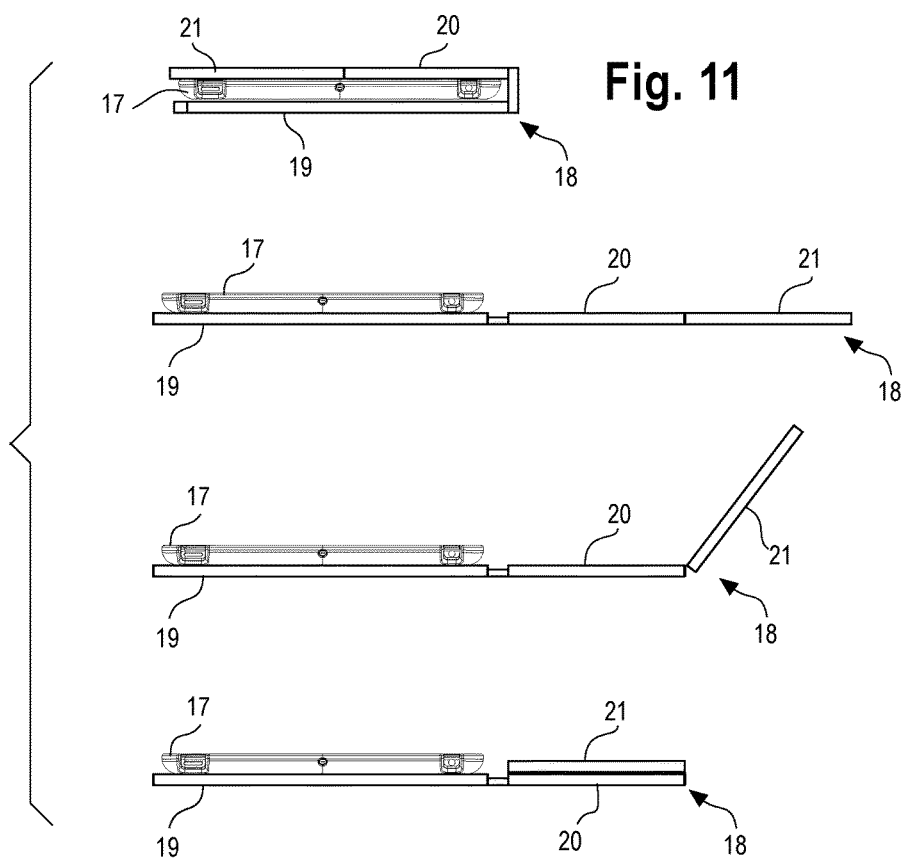

TABLET FOLIO WITH MULTI-CONFIGURABLE AND POSITIONAL FEATURES

BACKGROUND OF THE INVENTION

Field of the Invention

The present invention relates to portable electronic technology devices, in particular computer tablet holders, stands and folios and their keyboard accessories. More specifically, the invention relates to tablet holders or risers attached to and removable from folios. The tablet holder or stand may be arranged in multi-configurable positions that are advantageous to the user. Along with this, we are disclosing a magnetic means to temporarily assemble or attach an accessory such as a keyboard to such a folio for ease of placement, registration and transportation of the accessory and folio in tandem.

Background Art

The typical computer tablet folio uses an outer cover with a flexible fabric hinge located between two panels. The panels each have an inner surface and an outer surface. The outer cover can be rigid or be constructed of soft material. The folio's flexible soft fabric hinge allows for the folio to be configured into multiple positions since the hinge pliable allowing for one of the covers to be folded into acute, obtuse angles and over upon itself with relative ease.

There are protective covers which temporarily register and attach themselves to the computer tablet like the Apple tablet cover, U.S. Pat. No. 8,143,983 or to a folio by mechanical means such as the device as described in U.S. Pat. No. 8,724,300. These patents disclose how to attach a protective cover or folio onto a tablet device which differs from this application's invention which discloses how to temporarily register and attach an accessory such as a keyboard to the protective folio vs. the computer tablet. The protective folio can be configured with a temporary assembly means which allow a computer tablet accessory such as a wireless keyboard to register itself to the proper location upon at least one of the folio cover's inner surface. Magnets advantageously provide such registration as they will self align. Additionally, when the keyboard is carried outside the folio in tandem with the folio (or alternatively, keyboard to keyboard, folio to folio or alternatively any combinations and numbers equal or greater than two), the temporary assembly feature allows the keyboard and the folio to be carried or stored in tandem more easily when compared to the more standard folio and keyboard accessory which do not have this feature built in. In the preferred embodiment, the folio includes a matrix of magnets, spaced so that they are equidistant horizontally and vertically, thereby allowing multiple placement options for the keyboard or other accessory, particularly where the keyboard or other accessory has magnets similarly spaced. In other embodiments, the spacing of the magnets need not be equidistant.

As expressed in this application, the common related art is dependent on the folio cover's inner surface as the resting or registration means allowing the tablet to be properly configured from the lowered or collapsed position or configuration into the upright or inclined position or configuration. In addition, the common related art does not disclose any of the following: the ability to slide (upon the inner surface of the folio cover) the riser assembly to center the tablet or move it in such a way to allow room for the keyboard accessory (or any other accessory), nor the ability to remove the riser assembly from the folio, nor the riser being independently functional without the need to engage the folio cover's inner surface to remain in the raised configuration. The common related art does not discloses a temporary assembly configuration in which an accessory registers and aligns itself to the folio; with the additional functionality as to ease the carrying and storing of these elements in tandem by the temporary assembly elements. None of the related art is configured to work in the way as the inventions described in this application. These and many other benefits will be forthcoming within this application as we describe the invention in more detail.

SUMMARY OF THE INVENTION

The use of portable computing products such as tablets see more active use as they replace laptop and desktop computers more and more. They are thinner, lighter and more convenient to carry with you as you move from place to place, during the work day and at home. Due to these reasons, the tablet computer will be the device of choice to take from meeting to meeting, at home and when traveling as well. The world is more interconnected and such a portable device's convenience can be enhanced by the accessories in which you use to protect, transport and use the computer tablet within. The more flexible and configurable the device without being overly cumbersome is desirable and needed in the marketplace today. The most common of these types of accessories for the tablet computer is a "folio" type product. A protective jacket that covers and or surrounds the computer tablet in such a way as to function with a book like cover, usually with at least one upright configuration for the tablet as to make easier to view and interact with when on a flat surface like a table or desktop.

Through observation and research, we have recognized the need for a folio with multiple unique configurations in which to position the computer tablet holding device. One of device's configurations allows for multiple use and viewing angles through the use of multi-configurable assembly which can be used with and without the folio. That is the multi configurable assembly or stand can be removed and used independent of the folio. Such a configuration is a multi-positional computer tablet holding device that can be used within a Folio, without relying on the structure of the folio itself, due to that, the holding device with riser feature can still function outside the folio itself. Still another is a riser device which works cooperatively with an accessory such as a keyboard. The cooperatively working feature aids in the use of these items functioning cooperatively with each other when assembled together as well as aiding for the easy transportability of these items when they are within proximity of each other (holding or storing the items next to each other).

The listed features and configurations described in this application should not be considered as limiting in any way and it will be obvious from the described invention how the tablet holding folio stand device can be re-configured to fit nearly any relatively flat portable electronic product. These and the other many other advantages of the present invention will become apparent from the descriptions and accompanying drawings.

The invention is directed to a folio and riser for holding a tablet, the folio having a first flap and a second flap, the first flap including a plurality of magnets arranged in a matrix, the magnets being spaced apart at a distance, the riser including a base having a pair of magnets, said individual magnets of the pair of magnets being spaced apart at the distance, the riser being selectively attachable at positions corresponding to the magnet positions of the folio.

The invention is further directed to the combination of a folio including a matrix of magnets, a riser having a first pair of magnets, and an accessory having a second pair of magnets, the riser attaching to the folio at a first position when registered with a third pair of magnets selected from the matrix of magnets, the accessory attaching to the folio at a second position, located adjacent to the riser, when registered with a fourth pair of magnets selected from the matrix of magnets.

BRIEF DESCRIPTION OF THE DRAWINGS

FIG. 4 is a rear perspective view of the riser assembly and folio shown in FIG. 2;

FIG. 5 is a rear perspective view of the riser assembly and folio, with the riser assembly moved to an offset position;

FIG. 7 is a plan view of the tablet and folio, with the riser assembly and attached tablet centered on the folio;

FIG. 7A is an underside plan view of the riser assembly with the base in a first position with respect to the support member so that the tablet is centered on the folio;

FIG. 8 is a plan view of the tablet and folio, with the riser assembly and attached tablet offset on the folio;

FIG. 8A is an underside plan view of the riser assembly, with the base in a second position with respect to the support member so that the tablet is offset on the folio;

FIG. 9C is a bottom view of the elevated riser assembly and tablet placed thereon;

FIG. 9D is a bottom right perspective view of the elevated riser assembly and tablet placed thereon;

FIG. 9E is a right side elevation view of the elevated riser assembly and tablet placed thereon;

FIG. 9F is a top right perspective view of the elevated riser assembly and tablet placed thereon;

FIG. 10 is a plan view of a folio and tablet, the folio including magnets to attach and position the tablet and accessories;

FIG. 11 is a side elevation view of a keyboard accessory and cover, the cover being convertible to a wrist rest;

DETAILED DESCRIPTION OF THE PREFERRED EMBODIMENT

Figure 1:
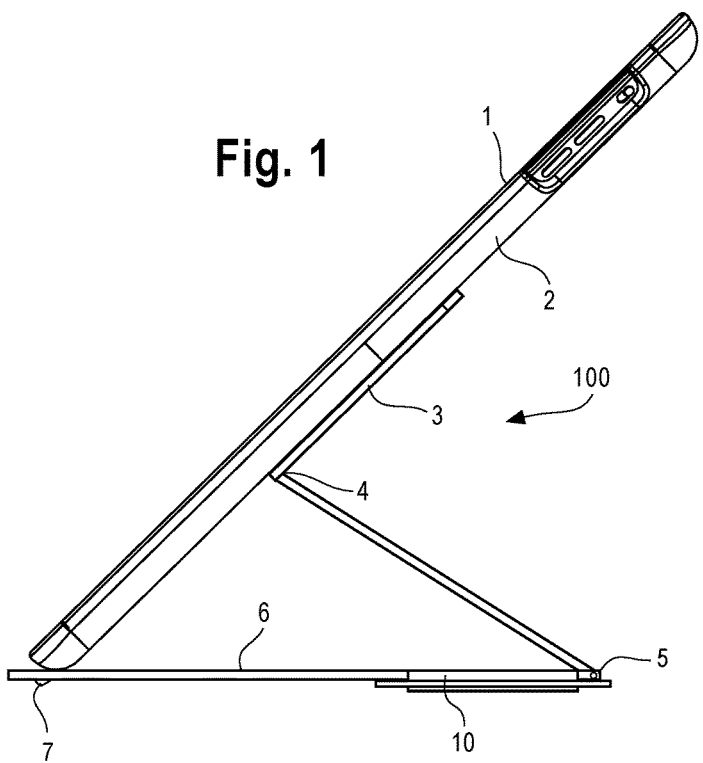
FIG. 1 is a side elevation of a tablet on a riser assembly or stand, removed from the folio.

As shown in FIG. 1, the invention includes an independent riser assembly 100 for the computer tablet 1, independent of the folio or the surface of folio 9. FIG. 1 illustrates the riser configuration with the computer tablet 1 inserted into holder 2 which is attached to riser connection 3 which can have an optional rotating assembly so that the holder 2 and tablet 1 are rotatable about the riser connection while the base 6 remains fixed, so that the holder 2 and tablet 1 can be placed in a portrait or landscape orientation, or rotated 180 degrees so that the tablet 1 may be viewed right side up if the folio 9 is also rotated 180 degrees. In such a rotation, the tablet 1 would be on the right side of the folio 9 to better accommodate left handed people who may want to write on a pad of paper on the left side of the folio 9.

The folio 9 includes a left flap 9a and a right flap 9b and a hinge between to allow the flaps to overlay one another and contain or cover the riser assembly 100 and tablet 1. Although the riser assembly 100 is shown on the left flap 9a, it may also be positioned on the right flap 9b in some embodiments.

The riser assembly 100 has at least a first or collapsed configuration that allows the tablet 1 to lie parallel to the base 6. The riser assembly also has at least one raised configuration or position, which allows the tablet 1 to be presented for use at an angle to the base 6. When in the raised position, the riser hinge 4 and riser hinge 5 are engaged and in a stable semi-locked position due to the edge of holder 2, or extended tabs on holder 2, engaging notches or notched tab receiver 7 on the base 6. There can be at least one or more notched tab receivers 7 located on base 6, depending on the desired riser angles to create a stable configuration independent of the folio 9, or alternately on the folio's surface if the riser assembly 100 is attached to the folio 9.

The riser assembly 100 may also include a support member 10, that may be used to attach the riser assembly 100 to the folio 9. In the preferred embodiment, the support member 10 is rectangular. The support member 10 is shaped to fit in a well or other receiver on the surface of the folio 9 that has a complimentary shape. In other embodiments, the support member may be square, or of another shape that allows the support member 10 to fit in the receiver in multiple configurations or positions. For instance a square support member 10 can be placed into a square receiver in 4 different configurations or positions, each 90 degrees apart. The support member 10 may be retained in the receiver by friction fit, sliding tabs, or other means known in the art. In some embodiments, particularly where magnets are used, the receiver is not needed, and the support member may simply be positioned on the surface of the folio 9 without a receiver or well.

Figure 2:
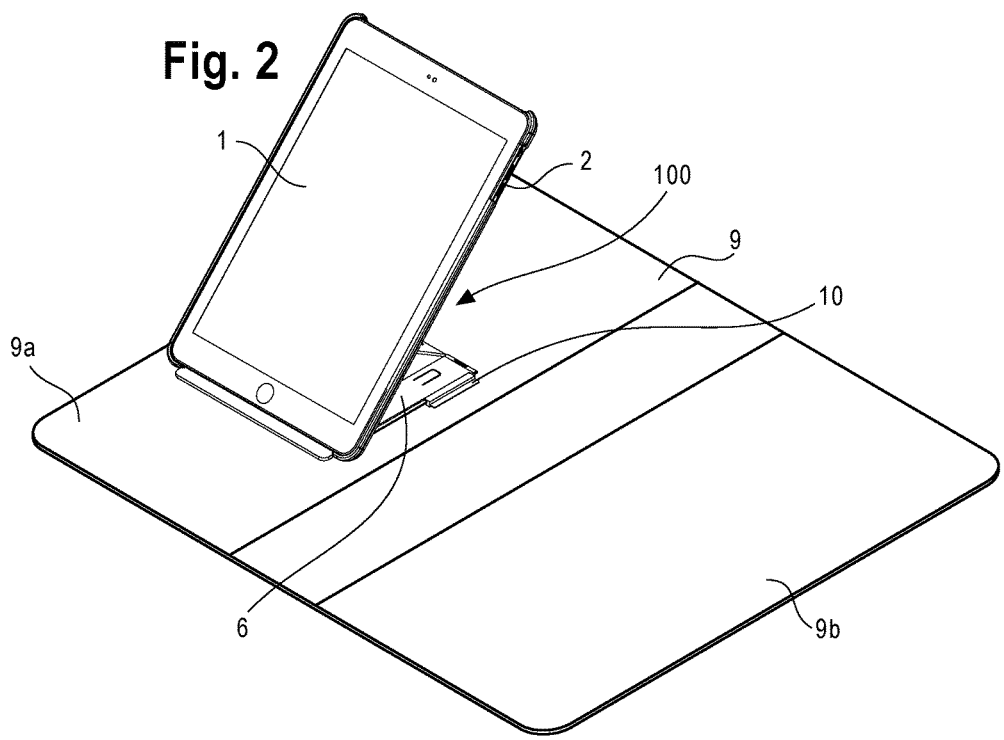
FIG. 2 is a perspective view of a tablet on a riser assembly or stand in an inclined position and in a portrait orientation, attached to a folio with the stand in a centered position such that the tablet is centered when the riser assembly is folded flat.
Figure 3:
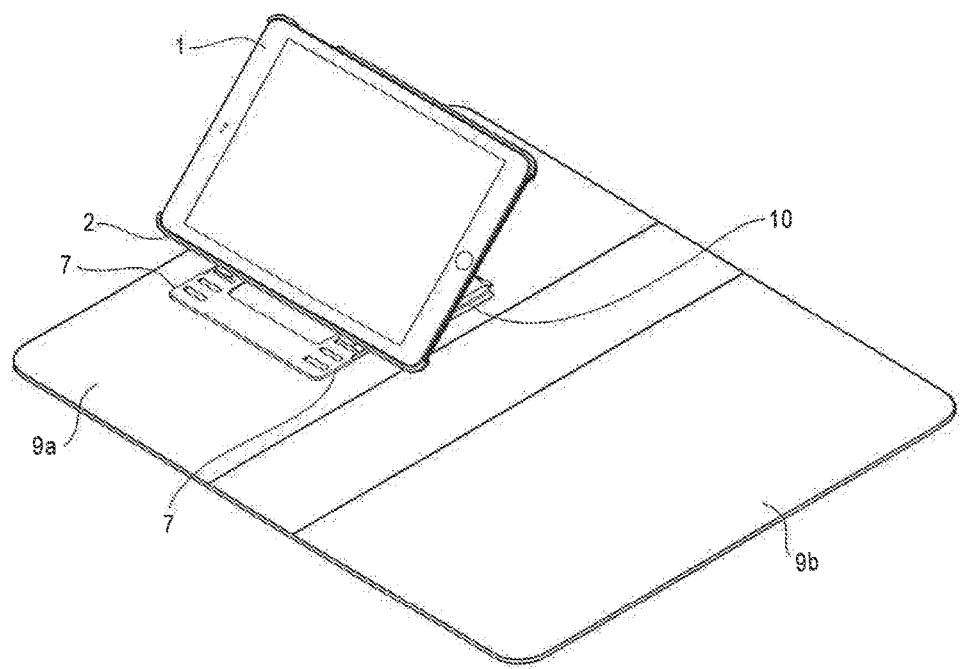
FIG. 3 is a perspective view of a tablet on a riser assembly or stand in an inclined position and in a landscape orientation, attached to a folio with the stand in a centered position such that the tablet is centered when the riser assembly is folded flat.
Figure 6:
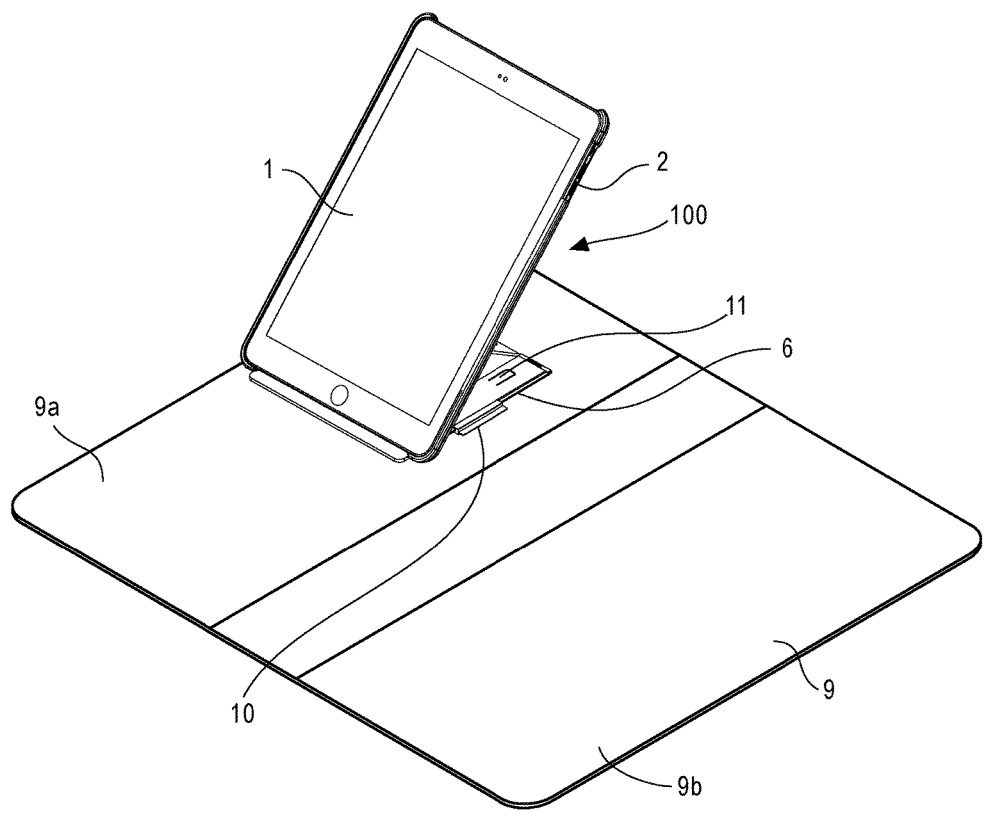
FIG. 6 is a front perspective view of the riser assembly and folio, with the riser assembly moved to an offset position.

In the preferred embodiment, the support member 10 is in a slidable relationship with base 6 of the riser assembly 100. This allows the riser assembly 100 to be placed in various positions along the surface of the folio 9 if the support member 10 is in a fixed position of attachment to the folio 9 surface. FIGS. 2, 3, and 4 show a first position where the support member 10 is positioned to the rear of the base 6, resulting in a tablet 1 that is centered on the folio 9 if the riser were collapsed. FIGS. 5 and 6 show a second position where the support member 10 is positioned to the front of the base 6, resulting in a tablet 1 that is offset on the folio 9 if the riser were collapsed The support member 10 may include stops 11 to fix or secure the base 6 of the riser assembly 100 at select positions.

Figure 12:
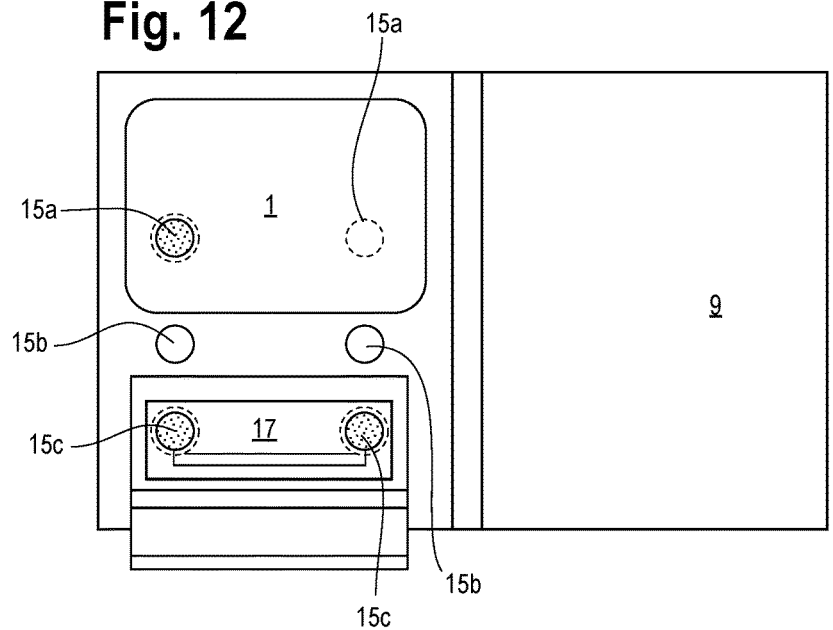
FIG. 12 is a plan view of a folio, tablet, and keyboard accessory, the folio including magnets to attach and position the tablet and accessory.

In other embodiments, the riser assembly may not incorporate a separate base 6 and support member 10 that are in a slidable relationship. In such embodiments, the base 6 performs the function of attaching the riser assembly 100 to the folio 9 and there is no need for the support member 10. The base 6 interacts with the folio 9 to provide attachment. In such embodiments, the base 6 is shaped to interact with the receiver or well on the folio as described above for the support member 10. In other embodiments where magnets are used, a receiver or well is not needed, as the position of the magnets allow for registration and particular positioning of the riser assembly 100 on the folio 9. For example, a first pair of magnets spaced apart at a particular distance can be placed on or in the folio 9 at a first position. A second pair of magnets spaced apart at a particular distance can be placed at a second position on or in the folio 9. Additional magnets or pairs of magnets may be used. For instance three pairs of magnets 15a-c are shown in FIGS. 10 and 12. The riser assembly 100 base 6 (or the support member 10) can include a pair of magnets spaced apart at a particular distance, the distance being the same as the spacing of the magnet pairs of the folio 9. This arrangement allows the riser assembly 100 to be selectively placed and secured at a first position on the folio 9, or at a second position on the folio 9, the magnets allowing the riser assembly 100 to align and register at the selected position. Such use of a matrix of magnets or a plurality of magnets with a particular spacing, which may be of any number of magnets or pairs, allows multiple placement positions of the riser assembly 100 on the folio 9.

As shown in FIGS. 2, 3, and 4 in the preferred embodiment, the riser assembly 100 is connected to a folio 9 by the support member 10 connected to the surface of the folio 9. The riser assembly 100 includes a riser connection 3 that has a rotating feature allowing the tablet holder 2 to rotate at riser connection 3 at least ninety degrees (or more) to allow the computer tablet 1 to be rotated and viewed in both landscape and portrait modes. The riser assembly 100 holding computer tablet 1 in the raised position is stable without the need of engaging folio 9 (shown) or any of its surfaces. The riser assembly 100 is positioned with respect to the folio 9 so that the tablet 1 is centered on the left side of the folio 9 when the riser assembly 100 is collapsed, as shown in FIG. 3.

Figure 7B:
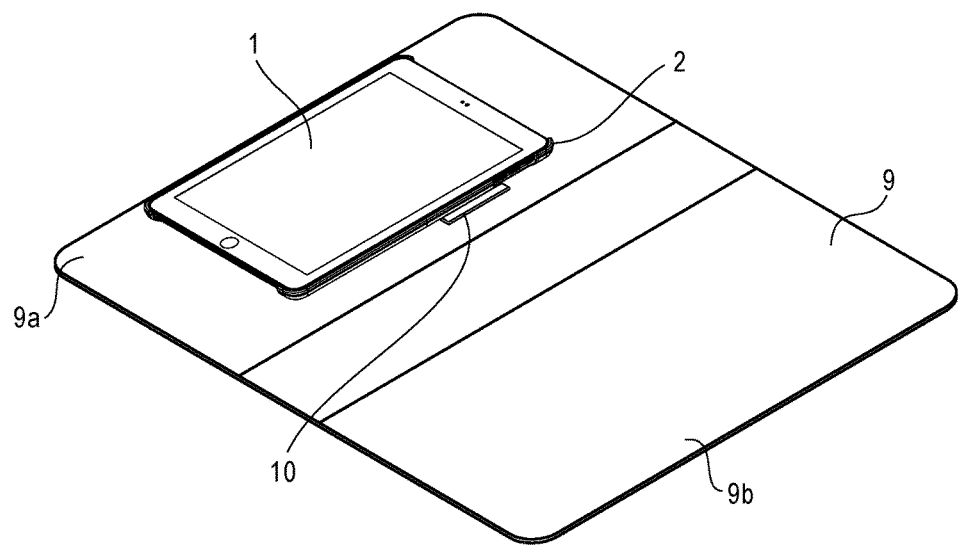
FIG. 7B is a perspective view of the tablet and folio, with the riser assembly and attached tablet centered on the folio.
Figure 8B:
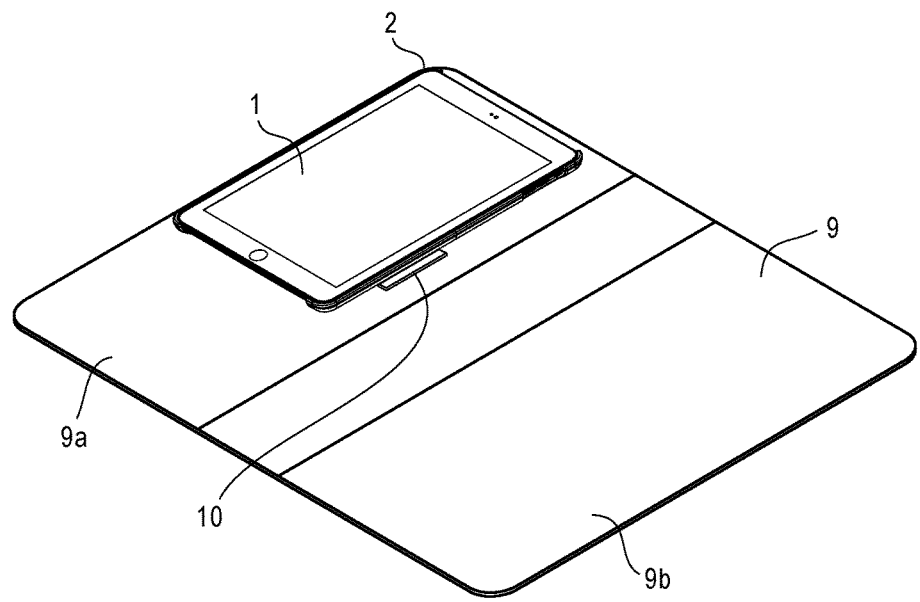
FIG. 8B is a perspective view of the tablet and folio, with the riser assembly and attached tablet offset on the folio.
Figure 9A:
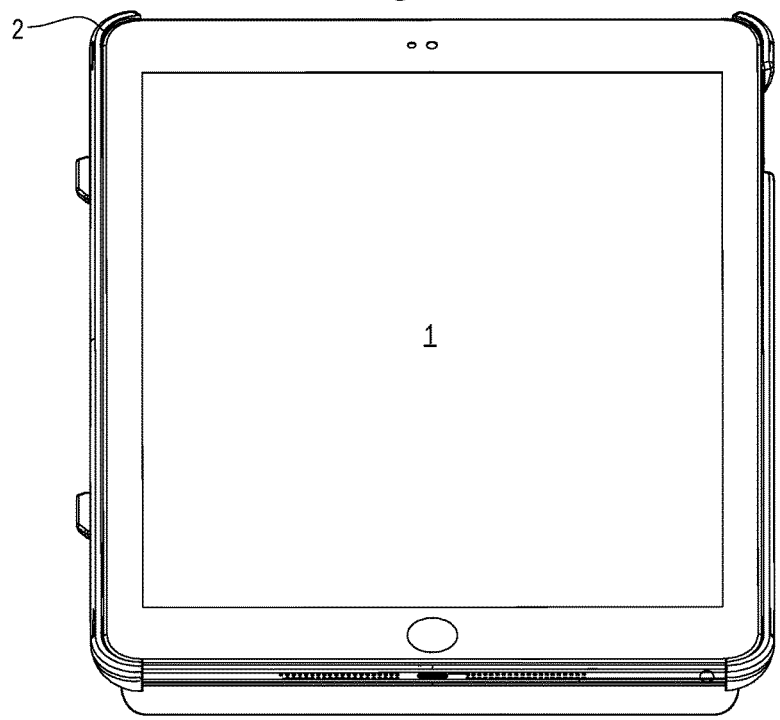
FIG. 9A is a top view of the elevated riser assembly and tablet placed thereon.
Figure 9B:
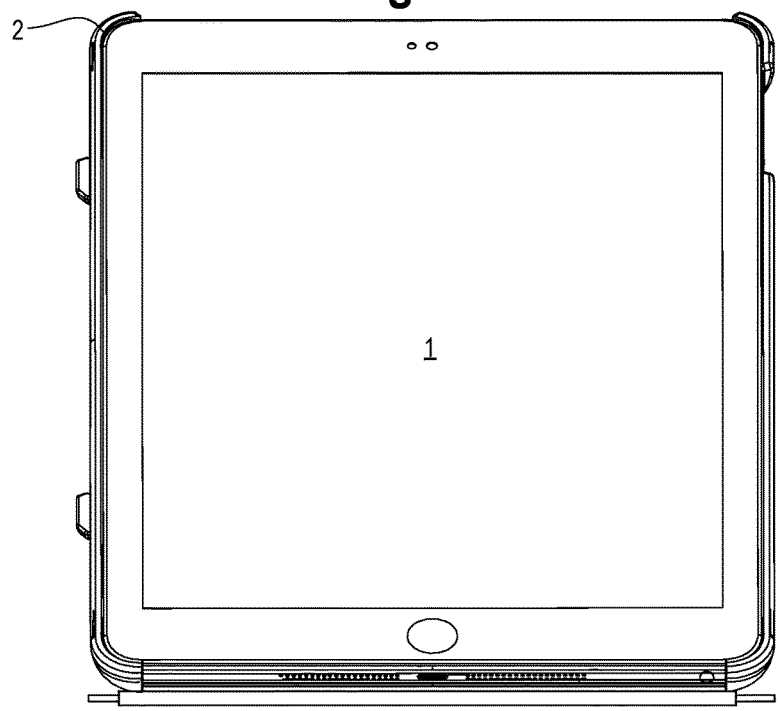
FIG. 9B is a front, elevation view of the elevated riser assembly and tablet placed thereon.
Figure 9G:
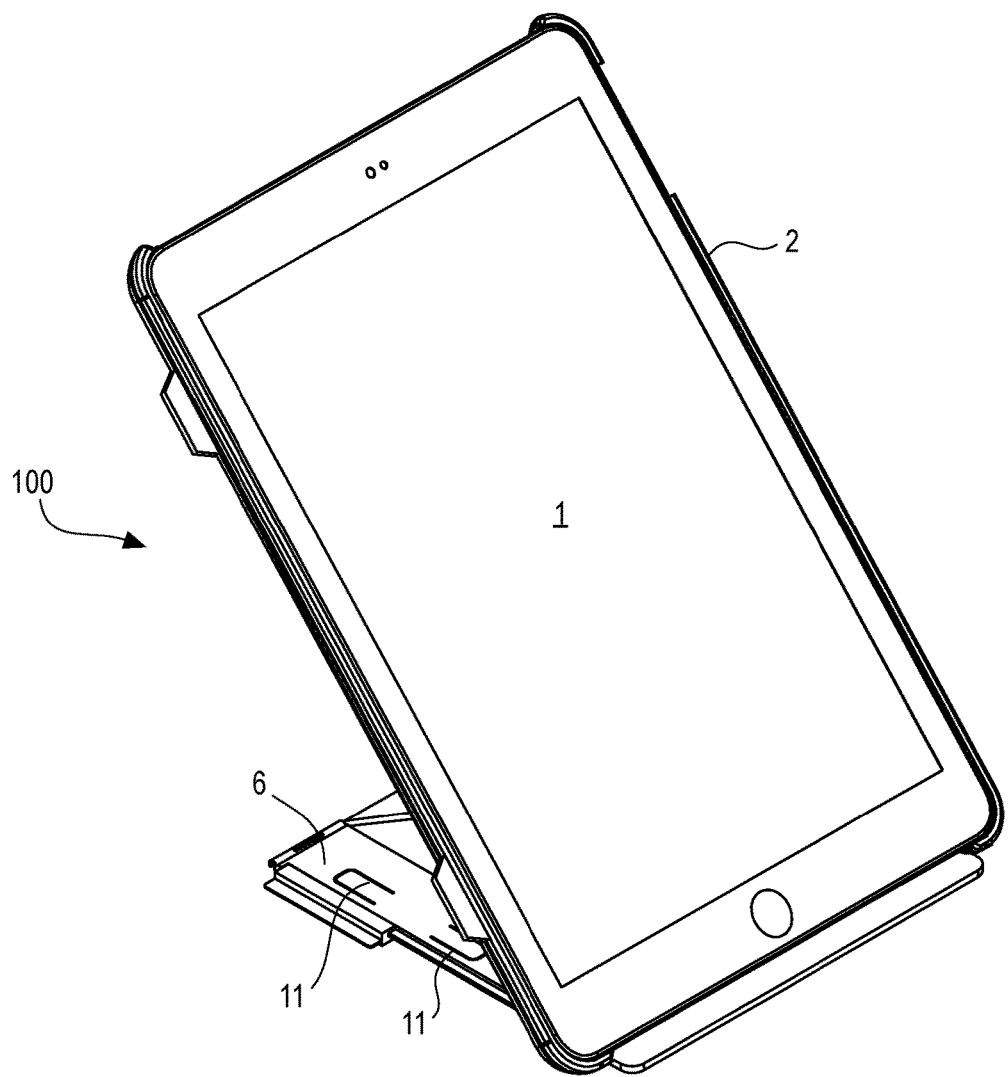
FIG. 9G is a top left perspective view of the elevated riser assembly and tablet placed thereon.
Figure 9H:
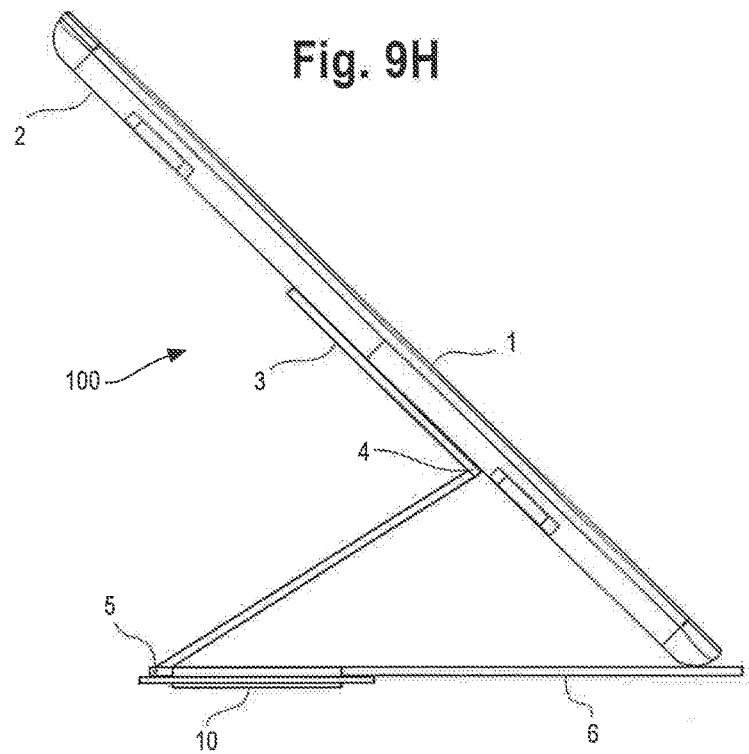
FIG. 9H is a left side elevation view of the elevated riser assembly and tablet placed thereon.
Figure 9I:
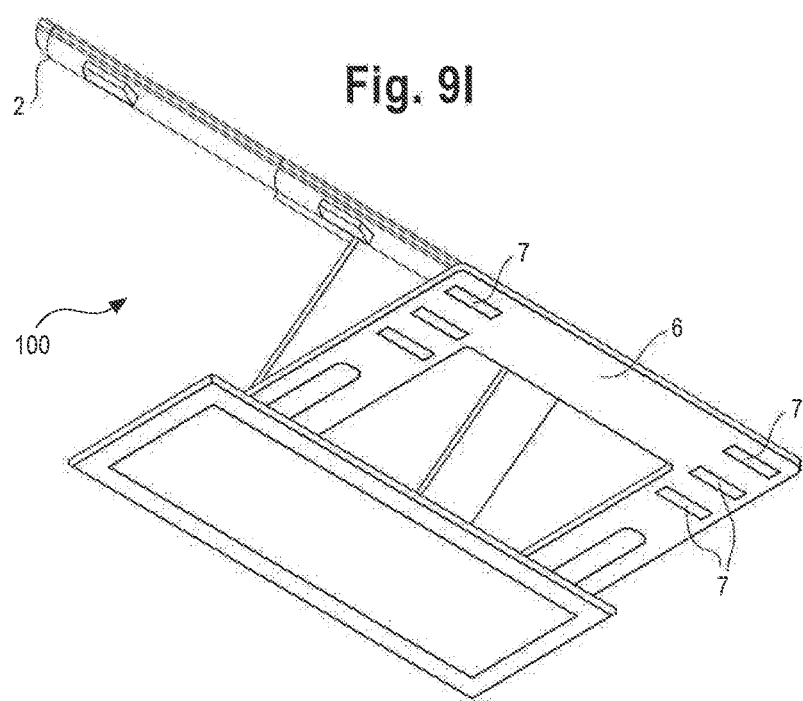
FIG. 9I is a bottom left perspective view of the elevated riser assembly and tablet placed thereon.

FIGS. 7-8B show the invention as with the riser assembly 100 in a collapsed or lowered (versus raised) position. FIGS. 7-7B shows an embodiment in which the riser assembly 100 is centered in portrait mode. FIG. 7A shows the relationship between the riser base 6 and the support member 10 in such a centered configuration. FIGS. 8-8B shows an embodiment in which the riser assembly 100 is offset in portrait mode. FIG. 8A shows the relationship between the riser base 6 and the support member 10 in such an offset configuration. The sliding or adjustable relationship between the base 6 and support member 10 allow the tablet 1 to be centered when in landscape mode (not shown) as to be balanced and easier to carry within a larger folio cover, or slid upwards when in portrait orientation as in FIG. 8, to leave room (shown by a dotted line square in FIG. 8) for an accessory such as a keyboard to be used in conjunction with the tablet 1. The keyboard can be stored within the larger folio since the tablet can be moved while still being attached. Note that FIGS. 7A and 7B are not oriented the same as 7 and 8. The top of 7 and 8 correspond to the bottom of 7A and 8A.

FIGS. 9A-I are an illustration of the invention as described in the embodiment in which the riser assembly 100 can be disconnected from the folio 9 and act as an independent stand or riser. The figures show various views of the riser assembly without the folio 9. This configuration is possible due to the riser assembly 100 being self-supporting and stable on the base 6 and support member 10 when removed from and independent of the folio 9. The riser assembly 100 can be then configured with a temporary attachment method such as a latch, slide, tab, magnets or VELCRO hook and loop fasteners in which to attach itself to the folio 9 or folio cover and still be removable when needed. For instance, the support member 10 can include hook or loop fasteners that are complimentary to hook or loop fasteners on the surface of the folio 9. In other embodiments, the riser assembly base 6 or support member can include magnets to attach to metal or magnets on the folio. In one such embodiment, the support member 10 can be fixed to the base 6 rather than being slidable, and the support member 10 or base 6 can include a plurality of magnets located at set intervals. The folio 9 may include magnets 15 or metal such that the riser assembly 100 can set at a first position if a first set of magnets on the base 6 or support member 10 is selected for use, or a second position if a second set of magnets is used. Similarly, the folio 9 may include a plurality of magnets or magnet sets, such as a first set of magnets 15a and second set of magnets 15b, as shown in FIG. 11, allowing the riser assembly 100 with the tablet 1 to be positioned at multiple selected positions.

Due to the ability for the riser assembly's ability to support a computer tablet 1 without the need or engagement with the folio cover, the riser assembly can have a rotating feature as well. This allows the user to rotate the computer tablet 1 and riser assembly 100 towards another viewer/s. The usefulness of the separation of the computer tablet 1 to the folio is realized as you use the folio 9 to take written notes and interact with files and paper while the tablet holds and interact with the digital files, programs and the internet. The folio 9 and detached riser assembly 100 can be separated and independently placed or arranges on a work surface. The dual use of the folio 9 due to the unique riser configuration is desirable as a person changes from paper based to digital documentation and communication.

FIG. 10 is an embodiment in which the riser assembly 100 and tablet 1 are retained in its lowered or collapsed position by magnets. As shown, the folio 9 includes a matrix of six magnets (15a-c) on or under the surface of one panel of the folio 9. The magnets 15a-c are positioned in pairs in the left of the inner folio 9 flap. With the positioning of the riser assembly 100 containing the tablet 1 on the upper part of the inner folio 9, the pair of magnets 15c located below the riser assembly 100 and tablet 1 allow for additional registration and temporary assembly or attachment of accessories to the lower inner folio flap. One skilled in the art will recognize that with a matrix of magnets, the riser assembly 100 and tablet 1, as well as other accessories can be positioned on the folio at multiple positions as the user may desire. These magnets 15a-c are shown by way of example, and the number and placement of the magnets can vary as the builder sees fit. As discussed above, the number of magnets 15 used on or in the folio 9 may vary in number. The use of more magnets, particularly a matrix of magnets, allows selective placement of the tablet 1 and riser assembly 100 at multiple locations on the folio 9. Similarly, accessories such as the keyboard accessory 17 can be placed at multiple locations. In the preferred embodiment, the magnets 15 are placed within the folio 9 such that the magnetic field can interact with magnets of accessories that are placed on the inside or outside surfaces of the folio 9.

Figure 13:
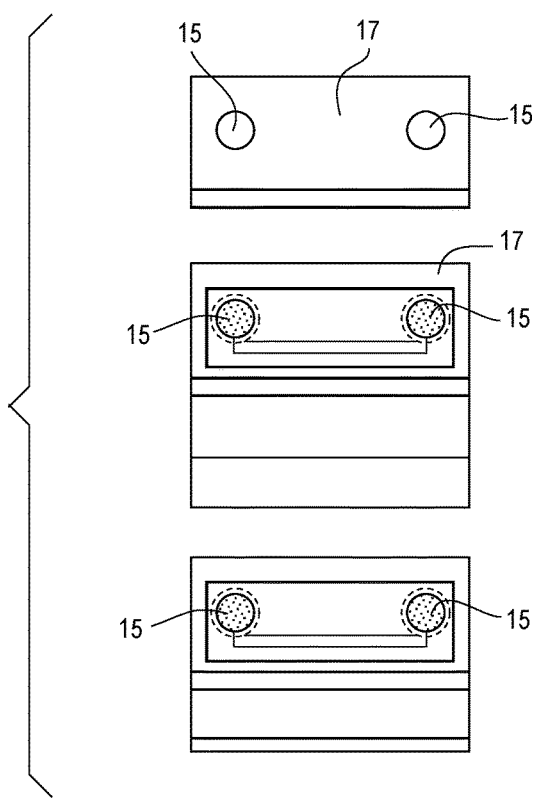
FIG. 13 is a plan view of a keyboard accessory and protective cover, the cover foldable to also create a wrist rest.

FIG. 12 shows an optional accessory 17, such as a blue tooth keyboard with a protective cover 18; this accessory has a foldable protective cover 18 which transforms into a wrist rest when a portion is folded onto itself as shown in FIG. 11. In FIG. 11, the protective cover 18 includes three portions, 19, 20, and 21. As shown in FIGS. 11, 12, and 13, the three portions 19,20, and 21 can be folded to form a wrist rest for those using the keyboard accessory 17. To form the wrist rest, the most distal portion 21 is folded over to rest on portion 20. This preferably places the user's wrists at or above the level of the keyboard accessory 17.

Figure 14:
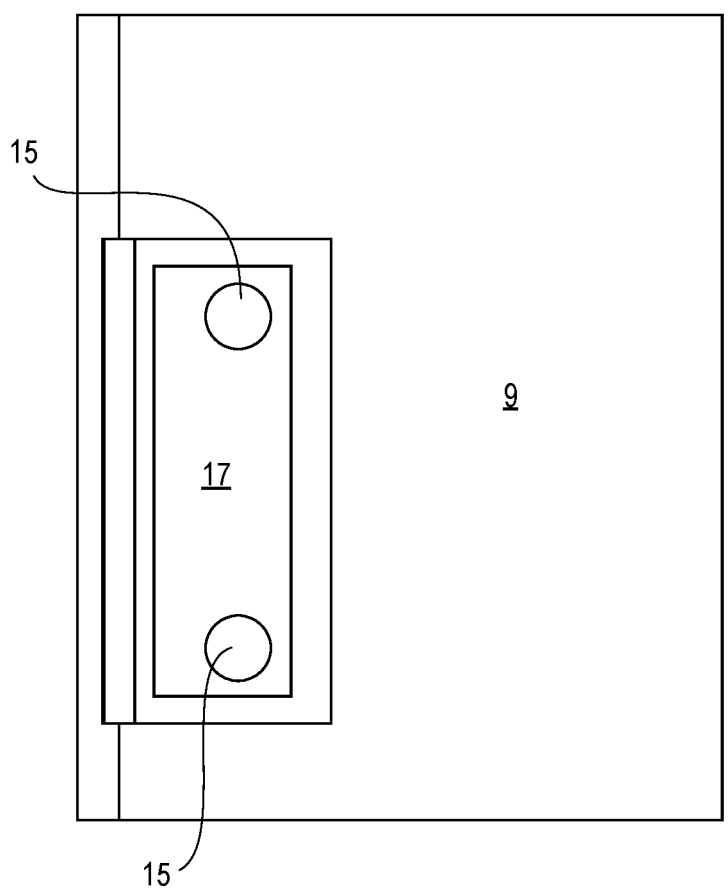
FIG. 14 is a plan view of a folio, with the keyboard accessory enclosed in its protective cover, attached by magnets to the exterior of the folio, the folio having magnets positioned and in registration with the magnets on the keyboard accessory.

The keyboard accessory 17 includes magnets 15 which coincide and are spaced to register with the placement of the magnets 15a-c in the inner flap of the folio 9. Due to the coincided placement of the magnets 15 on the keyboard accessory 17 and the inner flap of the folio 9, the keyboard accessory 17 can temporarily be assembled or attached to the inner flap of the folio as shown in FIG. 12, allowing the user to conveniently use the keyboard with the tablet 1 and folio 9. This temporary assembly and proper registration of the device makes the keyboard accessory 17 or other accessory so positioned and equipped with magnets 15 easier and more convenient to use with the folio 9 and computer tablet 1. In addition, the temporary assembly allows the accessory to be stored within the folio 9 when not in use, as the keyboard cover folds over the keyboard as shown in FIG. 11, allowing the keyboard and cover 18 to be contained within the bounds of the folio 9. FIG. 14 illustrates still yet another additional advantage with the use of magnets 15 as the temporary assembly or attachment method. The gauss field of the magnets project through the cover of the folio and the accessory (in this case the blue tooth keyboard 17) allowing the folio 9 and the keyboard 17 as shown in FIG. 14, to be easily carried or stored together in tandem to each other, whether inside the folio 9 when the folio 9 is folded to cover the tablet 1, or on the exterior of the folio 9. This allows for easier transportation and storage within a carrying device such as a computer bag or backpack or within one's hands when going from location to location. This feature makes institutional use in schools, hospitals or any other such business where mass storage or mass re-chargeability of such devices are need much easier since these devices can be aligned much easier to each other.

The illustration of these particular embodiments should not be taken as restrictive in any way since a myriad of configurations and methods using the underlying invention can be realized from what has been revealed in the application.

The listed products, features and inventive embodiments described in this application should not be considered as limiting in any way and it will be obvious from the described invention how the tablet holding rigid hinged devices and features can be re-configured to fit nearly any relatively flat portable electronic product and or used for many purposes than what has been described in this application.

The simplified illustrations are representative of possible construction and mechanical methods to obtain the desired features. The location of any detail or material can be constructed in such a way to relocate its position as shown in the simplified illustrations (such as a riser assembly being re-located to the opposing cover). The relocation and placement of certain features (such as the reference placement for magnets, hinge points and latches) from the positions referred to by description or illustrated in this particular application are easily understood and this application covers any and all of these as well.

The foregoing disclosure of specific embodiments is intended to be illustrative of the broad concepts comprehended by the invention.

The invention claimed is:

1. An apparatus including a folio and a riser for holding a tablet, the riser being removable from the folio and re-attachable to the folio, the folio having a first flap and a second flap, the first flap including a plurality of magnets arranged in a matrix, the magnets being spaced apart at a distance, the riser including a base having a pair of magnets, individual magnets of the pair of magnets being spaced apart at the distance, the riser being selectively attachable at positions corresponding to the magnet positions of the first flap of the folio, the pair of magnets of the base of the riser registering with the magnets of the first flap when the riser is in a raised position.

2. The apparatus of claim 1, wherein the riser assembly rotates the tablet from portrait to landscape orientation with respect to the folio.

3. The apparatus of claim 1, wherein the riser includes a support member to support the tablet at a plurality of viewing angles with respect to the first folio flap, the support member in a sliding relationship with the base.

4. The apparatus of claim 3, wherein the tablet is centered on the first flap of the folio when the base and the support member are in a first position with respect to each other, and the tablet is uncentered with respect to the first flap of the folio when the base and the support member are in a second position with respect to each other.

5. The apparatus of claim 4, wherein when in the second positon, an accessory includes an accessory pair of magnets spaced apart at the distance, the accessory pair of magnets removably attaching the accessory to the first flap of the folio by registering with a pair of magnets selected from the plurality of magnets on the first flap of the folio.

6. The apparatus of claim 5, wherein the accessory includes a protective cover having three portions, a first portion hingedly connected to a second portion hingedly connected to a third portion, the first portion including the accessory pair of magnets, the second and third portions folded one on top of each other to form a wrist rest.

7. The apparatus of claim 1, wherein the riser is stable in supporting the tablet in a raised position when the riser is removed from the folio.

8. The apparatus of claim 1, wherein the folio first flap includes an inside surface and an outside surface, the riser selectively attached to the inside of the folio, and the apparatus further including a detachable and re-attachable accessory, the accessory including an accessory pair of magnets spaced apart at the distance, the accessory pair of magnets removably attaching the accessory to the outside of the first flap of the folio by registering with a pair of magnets selected from the plurality of magnets on the first flap of the folio.

9. An apparatus including in combination, a folio including a matrix of magnets, a riser having a first pair of magnets, and an accessory having a second pair of magnets, the folio, riser, and accessory each being a separate item and removably attachable to each other, the riser attaching to the folio at a first position when registered with a third pair of magnets selected from the matrix of magnets, the accessory attaching to the folio at a second position, located adjacent to the riser, when registered with a fourth pair of magnets selected from the matrix of magnets.

10. The apparatus of claim 9, wherein the riser assembly rotates the tablet from portrait to landscape orientation with respect to the folio.

11. The apparatus of claim 9, wherein the folio includes a first folio flap and a second folio flap, the matrix of magnets positioned on the first folio flap, the riser including a support member to support the tablet at a plurality of viewing angles with respect to the first folio flap, the support member in a sliding relationship with the base.

12. The apparatus of claim 11, wherein the tablet is centered on the first flap of the folio when the base and the support member are in a first position with respect to each other, and the tablet is uncentered with respect to the first flap of the folio when the base and the support member are in a second position with respect to each other.

13. The apparatus of claim 12, wherein when in the second positon, an accessory includes an accessory pair of magnets spaced apart at the distance, the accessory pair of magnets removably attaching the accessory to the first flap of the folio by registering with a pair of magnets selected from the matrix of magnets on the first flap of the folio.

14. The apparatus of claim 13, wherein the accessory includes a protective cover having three portions, a first portion hingedly connected to a second portion hingedly connected to a third portion, the first portion including the accessory pair of magnets, the second and third portions folded one on top of each other to form a wrist rest.

15. The apparatus of claim 9, wherein the riser is stable in supporting the tablet in a raised position when the riser is removed from the folio.

16. The apparatus of claim 9, wherein the folio includes a first flap, the matrix of magnets located on the first flap, first flap including an inside surface and an outside surface, the riser selectively attached to the inside of the folio, and the apparatus further including a detachable and re-attachable accessory, the accessory including an accessory pair of magnets spaced apart at the distance, the accessory pair of magnets removably attaching the accessory to the outside of the first flap of the folio by registering with a pair of magnets selected from the plurality of magnets on the first flap of the folio.

* * * * *